Figure 1:
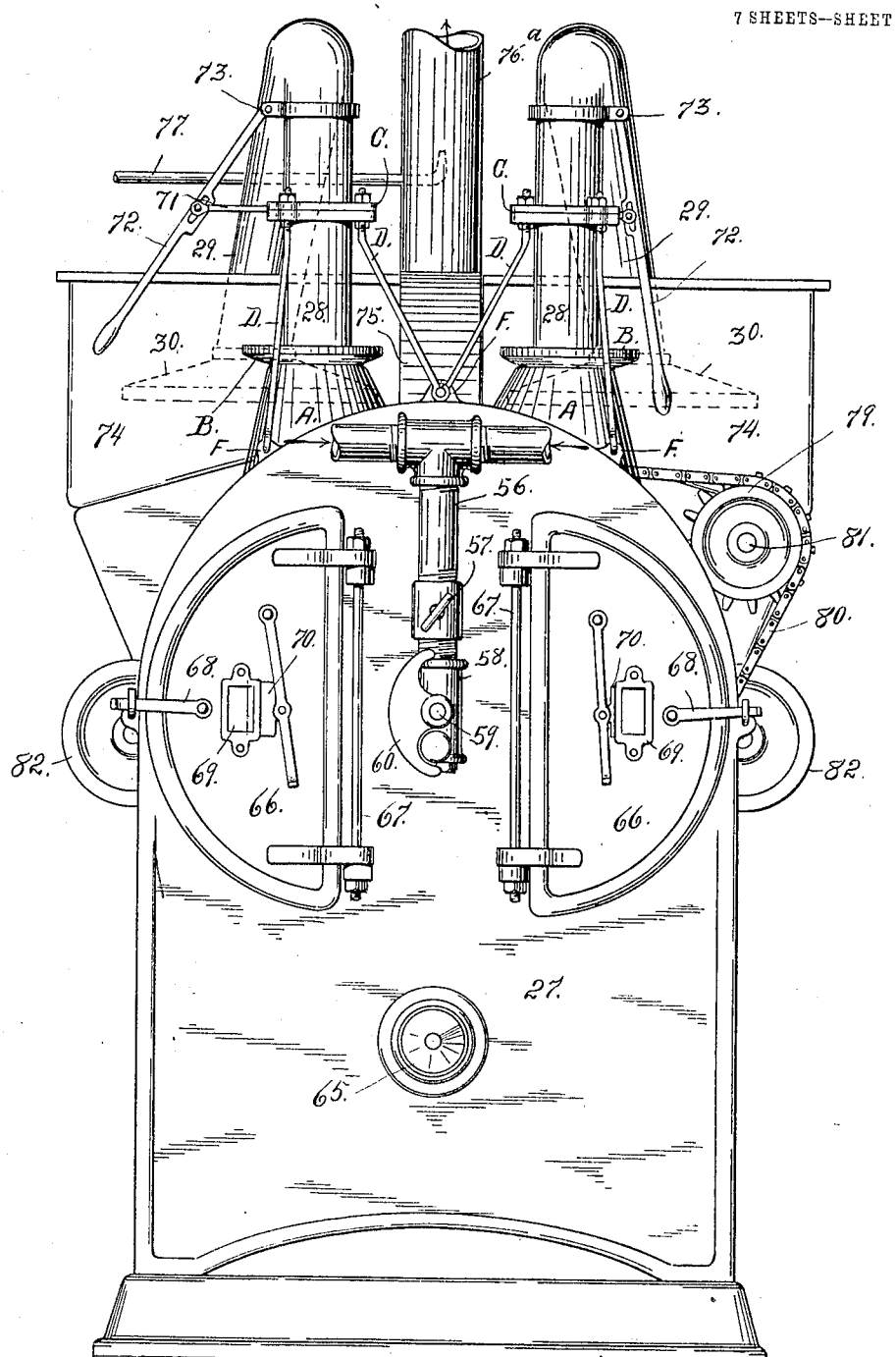

No. 895,656. PATENTED AUG. 11, 1908.
J. R. MOFFITT.
ROTARY RETORT FURNACE.
APPLICATION FILED JAN. 16, 1906.

7 SHEETS—SHEET 6.

Witnesses
Otto E. Hoddick
Dena Nelson.

Inventor
J. R. Moffitt
By
Attorney

No. 895,656. PATENTED AUG. 11, 1908.
J. R. MOFFITT.
ROTARY RETORT FURNACE.
APPLICATION FILED JAN. 16, 1906.
7 SHEETS—SHEET 7.
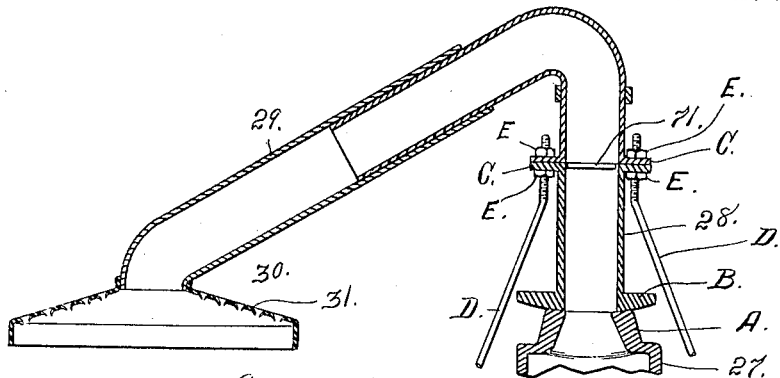
Fig. 7.
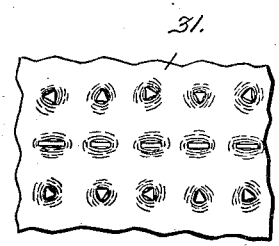
Fig. 8.
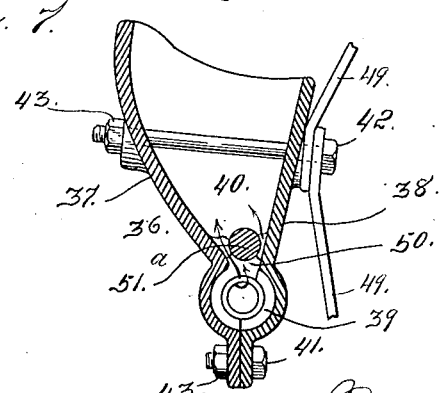
Fig. 10.
Fig. 9.
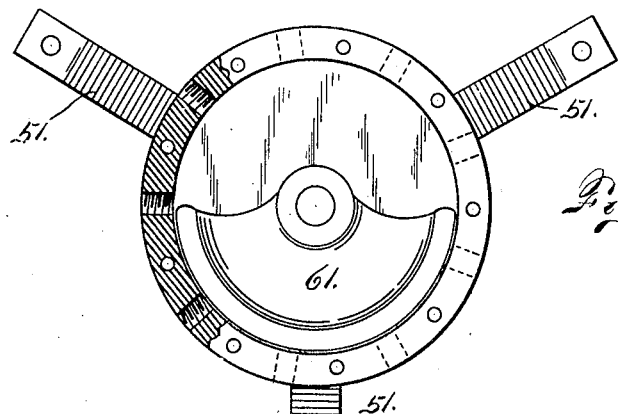
Fig. 11.
Witnesses
Otto E. Hoddick
Dena Nelson
Inventor
J. R. Moffitt
By A. R. Smith
Attorney

UNITED STATES PATENT OFFICE.

JOHN R. MOFFITT, OF DENVER, COLORADO.

ROTARY-RETORT FURNACE.

No. 895,656.      Specification of Letters Patent.      Patented Aug. 11, 1908.

Application filed January 16, 1906. Serial No. 296,389.

*To all whom it may concern:*

Be it known that I, JOHN R. MOFFITT, a citizen of the United States, residing in the city and county of Denver and State of Colorado, have invented certain new and useful Improvements in Rotary-Retort Furnaces; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to improvements in what I term a rotary retort furnace. This construction includes as shown in the drawing, a cylindrical retort mounted to rotate in the combustion chamber of the furnace, the retort, however, being shut off from the products of combustion which circulate around the furnace, the heat within the retort being communicated to the material under treatment by radiation. This retort is provided interiorly with a number of longitudinally disposed rabble troughs adapted to carry up the ore from the lower part of the retort and drop it downwardly when the trough has assumed the emptying or inverted position, the pulverized ore being in this manner advantageously subjected to the action of the heat within the retort. Provision is made for introducing atmospheric air (either hot or cold) under pressure, directly to the ore within the longitudinal rabble troughs. These troughs are so constructed that the air is introduced into a chamber adjacent the ore-holding portion of the trough, provision being made for allowing the air to escape in limited volume into the trough. By virtue of the retarding means employed between the trough and the air chamber, the latter forms a reservoir for air under pressure which is continually admitted into the ore-holding portion of the trough during a portion of the revolution of the retort. It is evident that as the retort is moving downwardly, the ore having been discharged therefrom, there is no necessity for the introduction of the air to the empty retort. Provision is therefore made for cutting off the air supply from the troughs on the downwardly moving side of the rotary retort. This is accomplished through the instrumentality of a valve or cutoff adapted to be readily actuated from the outside of the furnace. Provision is also made for carrying off the volatile products or fumes from the retort, and introducing them into a body of liquid whereby the fumes are condensed and their values saved. Another important result of this introduction of the fumes to the liquid body is that certain volatile impurities which are poisonous and injurious to life, are also condensed thus relieving the atmosphere in the vicinity of the furnace from the deadly fumes ordinarily attending the use of constructions of this class.

This furnace performs the roasting or oxidizing function in a most thorough and efficient manner and as heretofore indicated makes provision for saving all of the volatile values or those which would ordinarily pass off with the fumes.

Having briefly outlined my improved construction as well as the function it is intended to perform, I will proceed to describe the same in detail reference being made to the accompanying drawing, in which is illustrated an embodiment thereof.

Figure 2:
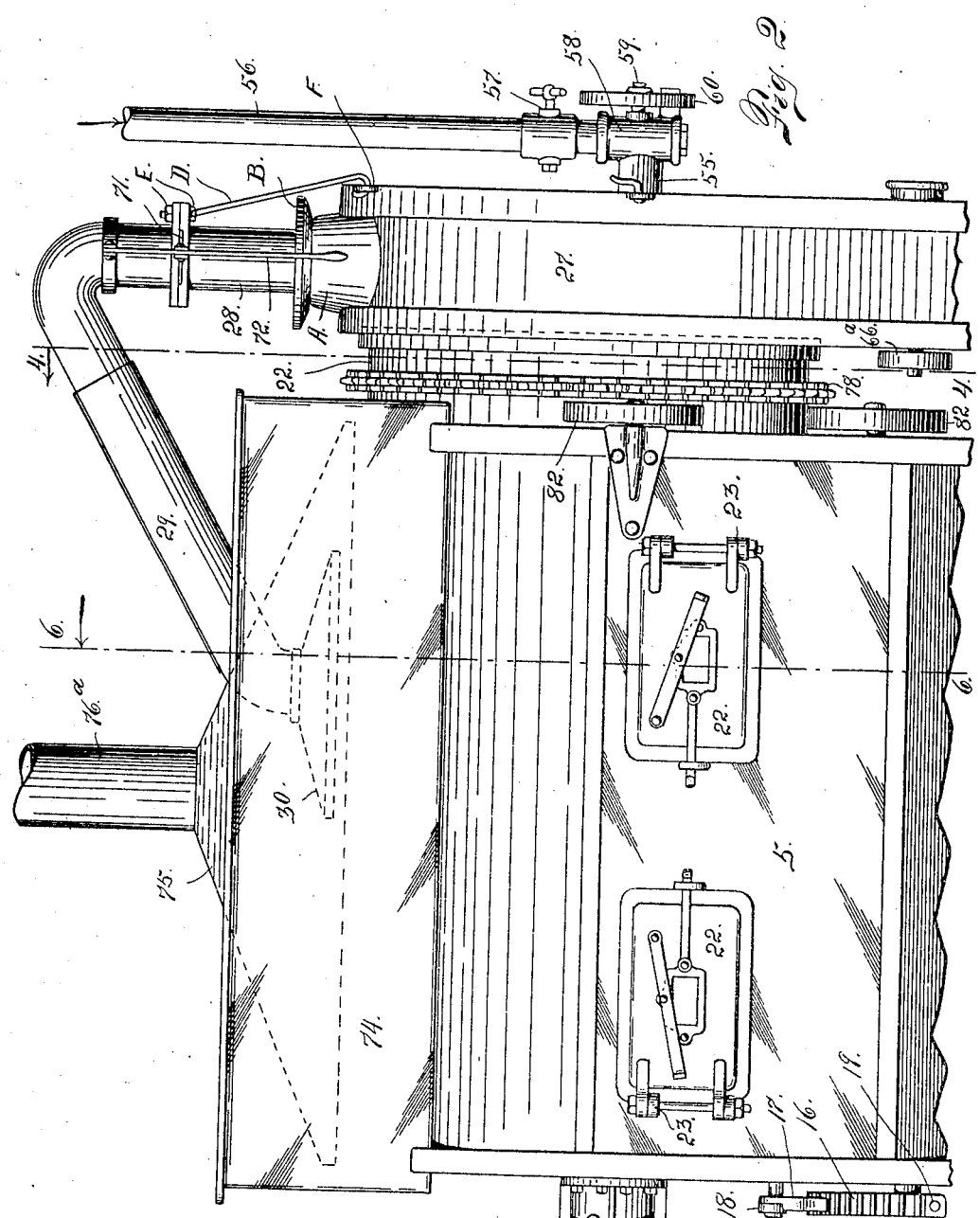
Figure 3:
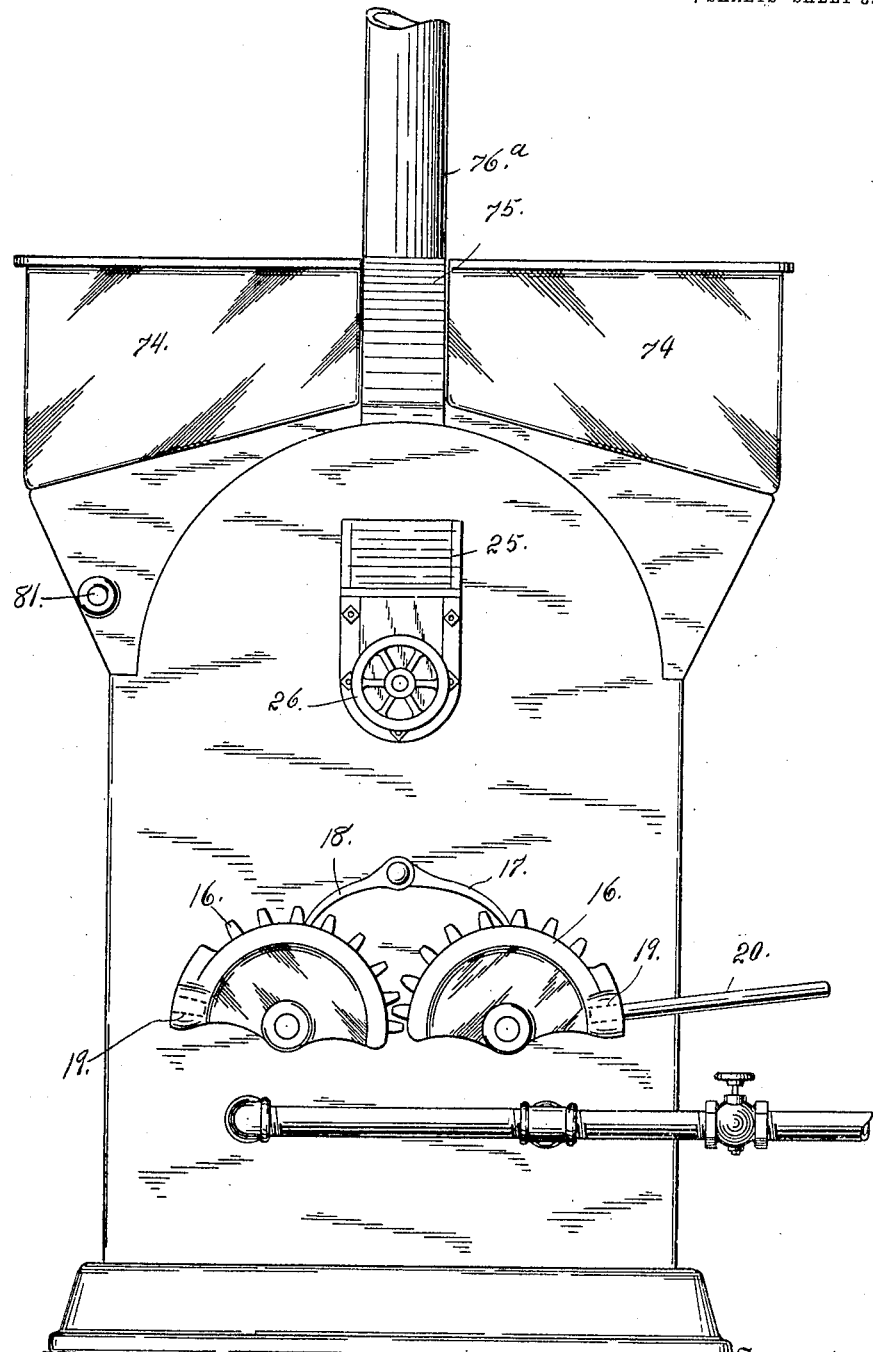
Figure 4:
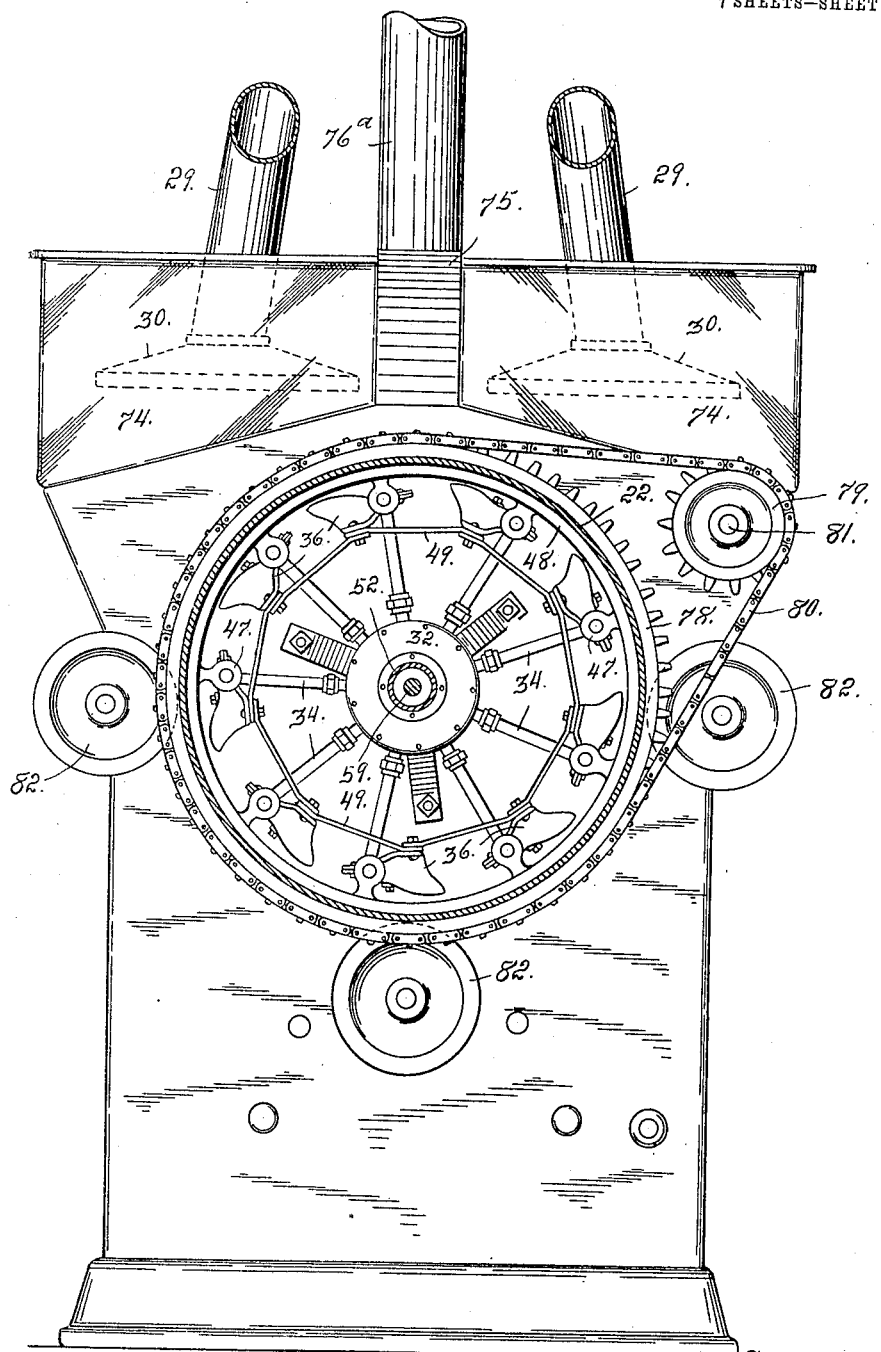
Figure 5:
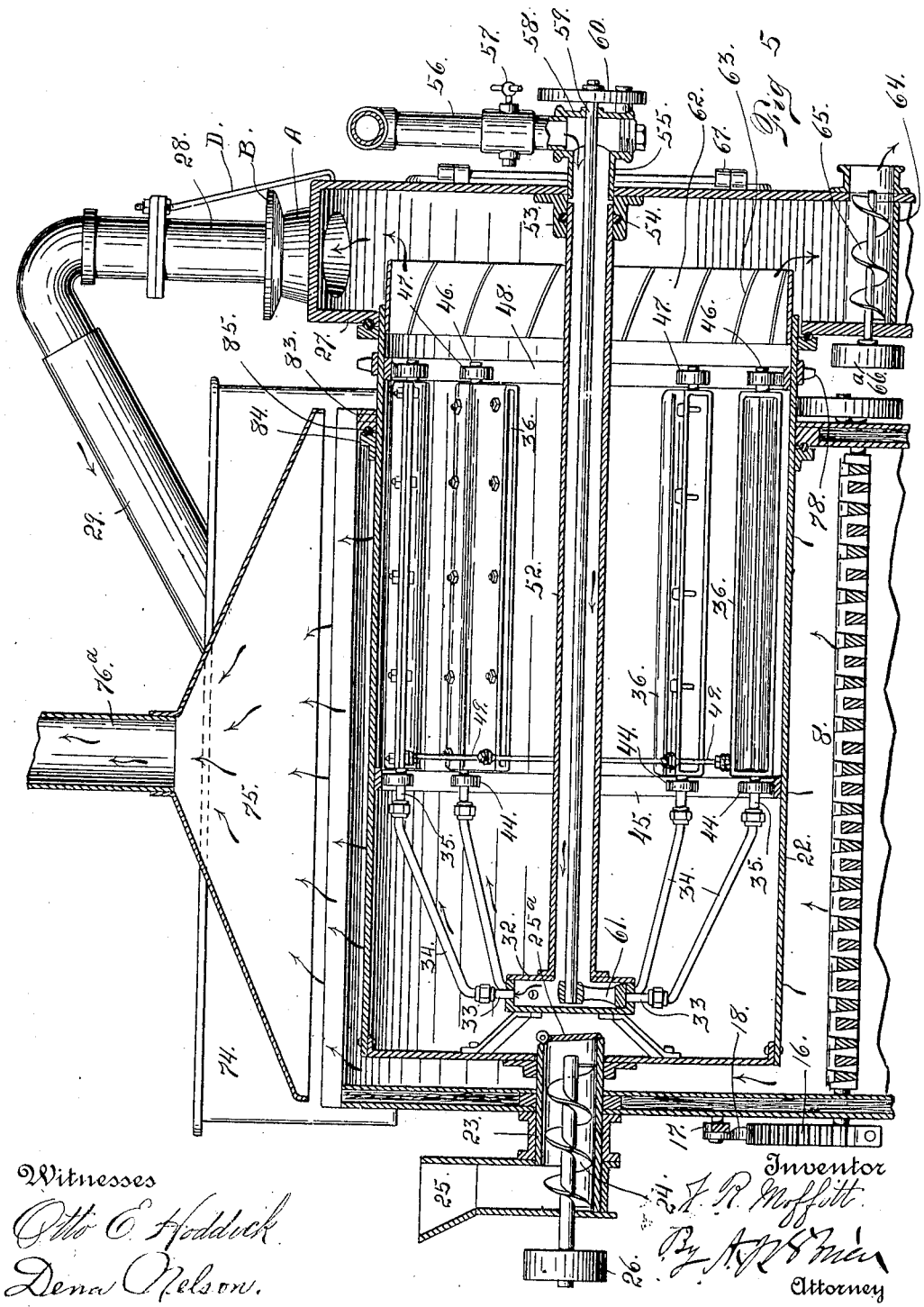
Figure 6:
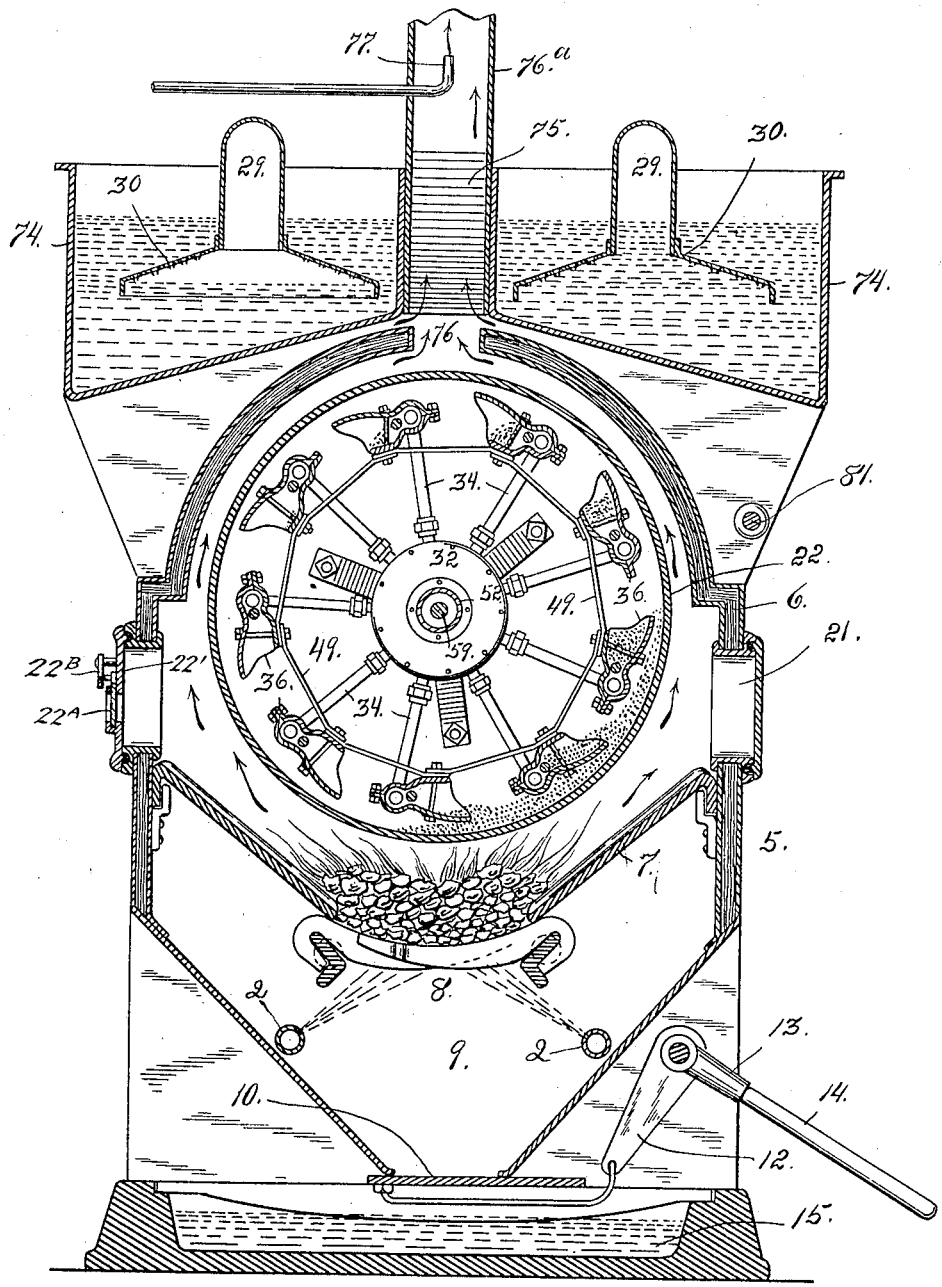

In this drawing, Figure 1 is what I will term a rear view of my improved apparatus since it illustrates the discharge extremity of the furnace. Fig. 2 is a side elevation of the same. Fig. 3 is a front end elevation of the furnace. Fig. 4 is a section taken on the line 4—4 Fig. 2 viewed in the direction of the arrow. Fig. 5 is a vertical longitudinal section of the furnace. Fig. 6 is a cross section taken on the line 6—6 Fig. 2. Fig. 7 is a detail view showing a conduit and a perforated hood employed for introducing the fumes to the body of liquid for purposes of condensation. Fig. 8 is a fragmentary top view of the perforated head. Fig. 9 is a sectional view of the same. Fig. 10 is a cross section of one of the troughs. Fig. 11 is an enlarged detail view of the air chamber from which the air is distributed to the various troughs. In this view the rear plate of the chamber is removed, thus disclosing the valve or cut-off. The wall of the casing is also shown partially in section.

The same reference characters indicate the same parts in all the views.

Let the numeral 5 designate the combustion chamber of my improved furnace which as shown in the drawing is composed of double walls with a filling 6 of asbestos or other suitable non-combustible substance which is also a poor conductor of heat. This fire box is provided with a bottom 7 and a grate 8 below which is the ash pit 9 closed at the bottom by a movable plate 10 controlled by a crank 12 having a socket 13 for the insertion of a handle 14 for operating purposes. Below the ash pit, the base of the furnace is provided with a water receptacle 15 into which the ash from the ash pit may be dropped. The furnace may also be cooled off by dropping the burning fuel from the bottom of the fire box, first into the ash pit and then into the liquid receptacle 15. The members of the grate 8 are actuated from the outside of the furnace by two meshing segmental gears 16 which are engaged by pivoted dogs 17 and 18, the distance between the cogs of the gear being sufficient to allow a limited shaking movement of the grate bars without disengaging the dogs. Each gear is provided with a socket 19 adapted to receive an operating handle 20 for operating purposes. If it is desired to dump the entire contents of the fire box into the ash pit, the dogs 17 and 18 will be thrown out of engagement with the gears in which event, by a proper movement of the handle 20 the grate bars may be thrown downwardly in which event the entire contents of the fire box will be precipitated into the ash pit. The fire box is supplied with fuel through side openings 21 normally closed by doors 22' hinged at 23 and provided with peep holes normally closed by some suitable transparent and non-combustible material 22ᴬ which has suitably connected thereto the bar 22ᴮ for opening and closing the same.

Within the combustion chamber above the bottom thereof, is mounted a revoluble retort 22. This retort, at the forward extremity of the furnace is journaled upon a conduit 23 containing a feed screw 24 to which the material to be treated is fed from a hopper 25. The outer extremity of the feed screw shaft is provided with an operating pulley 26. The inner extremity of the feed screw casing is provided with a hinged closure 25ᵃ the same being hinged at the top and adapted to open as the ore is crowded rearwardly by the feed screw. The rear extremity of the retort is journaled in a housing 27 located at the rear extremity of the furnace and into which the retort protrudes. This housing chamber communicates at the top with two fume conducting conduits 28 which extend upwardly and then downwardly telescoping in a member 29 provided at its lower extremity with a hood 30 which is open at the bottom but provided with perforated upper walls 31, these perforations being formed by punching whereby the metal forced out of the openings is pushed inwardly forming a rough and jagged inner surface for the hood. This rough and jagged surface together with the perforations, performs an important function in the condensation of the fumes, since these fumes are separated, strained and disintegrated so to speak, whereby they issue from the hood by a great number of passages which facilitates the distribution of the fumes through the body of liquid and causes thorough condensation. This liquid may be water or any other liquid compound or substance which may be found necessary in order to condense the valuable and poisonous fumes.

To the forward end of the retort immediately in the rear of the door 25 of the feed screw casing, is located an air chamber 32 provided with openings into which are screwed nozzles 33 communicating with conduits 34 terminating in members 35 connected with the forward extremities of the rabble troughs 36 mounted near the inner wall of the furnace and longitudinally disposed therein. The troughs are supported at their forward extremities by tubular members 35 which pass through apertured lugs 44 formed on a band 45 secured to the inner wall of the retort. The rear extremities of the troughs are provided with projections 46 which pass through apertured lugs 47 mounted on a band 48 secured to the inner wall of the retort. Furthermore the series of troughs is connected together by a polygonal shaped ring or band composed of a series of members 49 secured to each other and to the band by means of bolts 42 which pass through the troughs and are secured by nuts 43. These troughs as shown in the drawing are composed of two members 37 and 38 inclosing an air chamber 39 and an ore receptacle 40. The two members are connected by bolts 41 and further by the bolts 42 which connect the troughs with the polygonal ring as heretofore explained. The air chamber 39 is cylindrical in shape and has an opening 50 communicating with the ore receptacle 40 by spaces on opposite sides of a longitudinally disposed member 51ᵃ cylindrical in cross section. Through the instrumentality of this device the escape of air from the chamber 39 is sufficiently retarded to form the chamber 39 into an air chamber at a suitable pressure.

The air chamber 32 is connected with the forward extremity of the retort by a number of arms 51 which hold the air chamber suspended. With this chamber is connected the forward extremity of a conduit 52 which is longitudinally disposed and whose axis coincides with the axis of the retort. This conduit protrudes from the retort at its rear extremity and engages a bearing 53 attached to the rear wall of the housing 47. This bearing is provided with a packing 54 of asbestos or other suitable material forming an air tight joint around the conduit. The housing or rear extremity of the outer wall of the furnace is provided with an opening which is entered by a stationary inlet 55, communicating with an air pipe 56 in which is located a controlling valve 57. The rear extremity of the inlet 35 is closed at the rear as shown at 58 and through this closure passes a rod 59 provided with an exposed member 60. The rod 59 forms the stem of a valve 61 located in the air chamber, the valve being of the same shape as the exposed member 60. This valve is of sufficient size to close the orifices of the air chamber communicating with a number of conduits 34. As heretofore intimated it is not necessary that air should be delivered to the troughs of the retort except when the troughs contain ore. Therefore the valve is of sufficient size to close the orifices leading to the troughs on the downwardly moving side of the retort.

To the rear extremity of the rotary retort is attached a discharge member 62 provided with spirally arranged ribs of blades 63, to facilitate the discharge of the roasted ore, into the housing 27 whence it passes into a casing 64 provided with a screw conveyer 65 having a pulley 66ª at one extremity. This pulley may be connected with any suitable power for operating the discharge conveyer.

The rear extremity of the furnace or the rear wall of the housing 27 is provided with openings closed by doors 66 mounted to swing on rods 67. These doors are locked in place by latches 68. They are also provided with peep holes 69 preferably covered by some transparent material, a metal plate 70 being employed to protect the transparent device from the outside, except when it is necessary to view the interior operations of the furnace.

The fume conduits 28 are provided with dampers 71 operated by levers 72 fulcrumed as shown at 73.

As shown in the drawing there are two liquid-containing tanks 74 in which the hoods 30 with the fume conduits are immersed. Between these liquid-containing tanks 74, is located a hood 75 directly above an opening 76 communicating with the combustion chamber and located at the top thereof, for the escape of the products of combustion which as heretofore explained do not come in contact with the material under treatment. This hood communicates at its upper extremity with a stack 76ª into which may be introduced a jet pipe 77 through which air or steam under pressure may be passed to increase the draft of the furnace.

Attention is called to the fact that the rotary retort protrudes from the rear extremity of the combustion chamber and projects into the hood 27. Between the combustion chamber and the hood 27, the rotary retort is provided with a sprocket gear 78 connected with a smaller sprocket wheel 79 by means of a chain 80. The sprocket 79 is fast on a shaft 81 which may be connected with any suitable power for the purpose of imparting the rotary movement to the retort.

Between the combustion chamber and the rear housing 27, the wall of the furnace is provided with wheels or anti-frictional bearings 82 which engage the retort exteriorly for supporting and centering purposes.

At the rear extremity of the combustion chamber, the latter is provided with a ring 83 which engages a similar ring 84 fast on the exterior wall of the retort. Between these rings is interposed a packing 85 of some suitable non-combustible material as asbestos, in order to form an air tight joint where the retort passes out of the combustion chamber.

From the foregoing description the use and operation of my improved furnace will be understood. Assuming that there is a fire on the grate and the furnace is suitably heated, the ore to be treated is fed into the retort from the hopper 25 through the instrumentality of the screw conveyer 24. The retort is of course rotated and as the troughs move upwardly on one side thereof, they carry the pulverized ore with them, the same having been dipped from the lower part of the retort into which it is continually falling as it is fed into the rear extremity thereof. It must be understood that the retort as well as the entire structure is slightly inclined downwardly from its forward to its rear extremity whereby there is a tendency of the ore entering the forward extremity of the retort to move rearwardly or into the paths of the troughs. As these troughs are carried upwardly being filled with ore as indicated in Fig. 6, air is introduced under pressure from the air chamber 32 as heretofore explained. Under the influence of the heat of the furnace and the oxygen of the air, the ore is thoroughly roasted and deprived of its volatile impurities, which pass off in fumes, the fumes being carried into the hood 27 and thence through the conduits 28 into the liquid-containing tanks 74 where they are condensed as heretofore explained. As the troughs move downwardly on the downwardly moving side of the retort, they discharge their contents downwardly through the heated air of the furnace whereby the ore is advantageously exposed to the action of the heat. The operator takes care to adjust the valve 61 in operating its stem through the instrumentality of the exposed controlling device, so that the air will not enter the troughs on the downwardly moving side of the retort. The exposed member 60 of the valve stem 59 occupies the same position on the stem as the valve 61. Hence the operator always knows the position of the valve by looking at the member 60.

As the air is carried up by the rabble troughs on the upwardly moving side of the retort and falls downwardly on the opposite side, it is being gradually worked rearwardly toward the discharge end of the retort which it finally reaches and is delivered to the hood by the spirally ribbed member 62. After entering the hood it reaches the screw conveyer 65 and is discharged from the furnace.

The fume conduit 28 is provided at its lower extremity with a collar B which is somewhat curved on its lower surface and engages the correspondingly curved seat G formed on an upward extension A of the housing 27. As shown in the drawing (see Fig. 7) the conduit 28 is composed of two members having flanges C connected by the upper threaded extremities of rods D to which nuts E are applied above and below. The lower extremities of these rods are hooked into eyes F formed on the housing 27. Now if it is desired to move the hood 30 farther outwardly or toward the left referring to Fig. 7, without plunging the hood deeper in the liquid, this may be done by adjusting the nuts E on the rods D in such a manner as to raise the flanges C on one side of the conduit and lower these flanges on the other side of the conduit whereby the hood is tilted, and the collar B shifted on its seat accordingly.

Through the instrumentality of conduits 2 projecting into the ash pit 9, air under pressure may be delivered to the grate and caused to pass upwardly into the fire box to aid combustion.

Having thus described my invention, what I claim is:

1. In apparatus of the class described, the combination with a combustion chamber, of a retort mounted to rotate therein but cut off from communication therewith, rabble troughs mounted in the retort and rotating therewith and connected together by a series of members forming a polygonal shaped ring or band, each trough being provided with an air chamber and an ore receptacle communicating therewith, and means for introducing air under pressure to the air chambers, said means comprising an air chamber carried by the retort and communicating with the individual air chambers of the respective rabble troughs.

2. In apparatus of the class described, the combination with a combustion chamber, of a retort mounted to rotate therein and provided with rabble troughs, each trough having an air chamber and an ore receptacle, the two chambers being in communication with each other, and means for introducing air under pressure to the individual air chambers of the troughs comprising a common air chamber carried by the retort and communicating with the individual air chambers of the respective rabble troughs, a valve located in the common air chamber and adjustable from the outside of the furnace for cutting off the air chamber from the rabble troughs while moving through a predetermined arc of their travel.

3. In apparatus of the class described, the combination with the combustion chamber, of a retort mounted to rotate therein and whose interior is cut off from communication with the combustion chamber, rabble troughs mounted in the retort to rotate therewith and connected together by a series of members forming a polygonal shaped ring or band, each provided with an air receptacle and an air chamber communicating therewith, and means for introducing air under pressure to the air chambers of the rabble troughs, and means for cutting off the air from the rabble troughs on the downwardly moving side of the retort.

4. In a construction of the class described, the combination with a combustion chamber, of a retort mounted to rotate therein but having no communication therewith, longitudinally disposed rabble troughs located in the retort and connected together by a series of members forming a polygonal shaped ring or band, means for feeding to the retort the material to be treated, and means for introducing air under pressure to the individual rabble troughs.

5. In a construction of the class described, the combination with a combustion chamber, of a retort mounted to rotate therein but having no communication therewith, rabble troughs located in the retort and connected together by a series of members forming a polygonal shaped ring or band, means for feeding to the retort the material to be treated, and means for introducing air under pressure to the individual rabble troughs comprising a common air chamber, and conduits leading therefrom to the respective troughs.

6. In a construction of the class described, the combination with a combustion chamber, of a retort mounted to rotate therein but having no communication therewith, rabble troughs located in the retort and connected together by a series of members forming a polygonal shaped ring or band, means for feeding to the retort the material to be treated, means for introducing air under pressure to the individual rabble troughs comprising a common air chamber and conduits leading therefrom to the respective troughs, and means for cutting off the air from the troughs while passing through a predetermined arc of travel.

7. The combination with a combustion chamber, of a retort mounted to rotate therein, rabble troughs located in the retort, means for feeding the material to be treated to the retort, an air chamber, means for introducing air under pressure to the rabble troughs, and means for cutting off the air from the troughs while passing through a predetermined arc of travel, said means comprising a valve located in the air chamber and adjustable from the outside of the furnace.

8. The combination with a combustion chamber, of a rotary retort located therein and whose interior is cut off from the combustion chamber, the retort being provided with rabble troughs located therein and longitudinally disposed and connected together by a series of members forming a polygonal shaped ring or band, an air chamber located in and connected to rotate with the retort and whose axis coincides with the axis of the retort, a centrally disposed conduit located in the retort and connected with the air chamber to deliver air thereto, an external connection for delivering air to the conduit under pressure, and conduits leading from the air chamber to the respective rabble troughs.

9. The combination with a combustion chamber, of a retort mounted to rotate therein and provided with rabble troughs located therein and rotating therewith and connected together by a series of members forming a polygonal shaped ring or band, an air chamber, conduits leading from the air chamber to the respective rabble troughs, a conduit connected with the air chamber and also rotating with the retort, the axis of the conduit coinciding with the axis of the retort, and exterior means for delivering air under pressure to the last named conduit.

10. The combination with a combustion chamber, of a retort mounted to rotate therein, and rabble troughs carried by the retort and rotating therewith and connected together by a series of members forming a polygonal shaped ring or band, a casing mounted at one extremity of the combustion chamber, protruding into the retort and forming a bearing for one end of the latter, a screw conveyer located in the said casing for delivering the material to be treated to the retort, rabble troughs located in the combustion chamber, an air chamber located directly in the rear of the feed conveyer, conduits leading from the air chamber to the respective rabble troughs, and means for introducing air under pressure to the air chamber.

11. The combination with a combustion chamber, of a retort mounted to rotate in the combustion chamber, rabble troughs carried by the retort, an air chamber mounted to rotate with the retort, conduits leading from the air chamber to the respective rabble troughs, a valve located in the air chamber, a stem connected with the valve and disposed in axial alinement with the retort, and protruding therefrom, its outer extremity having a member shaped and disposed to correspond with the shape and position of the valve.

12. The combination with a combustion chamber, of a retort revoluble therein, a feed pipe mounted at one extremity of the combustion chamber, provided with a hinged closure, said pipe protruding into the retort and forming a bearing for the latter at one end, a screw conveyer located in the feed pipe, a housing open to receive the rear extremity of the retort beyond the combustion chamber and forming an exterior bearing for the retort, sufficient space between the housing and the chamber to allow power means to be applied to said retort, and a conveyer located at the bottom of the housing and protruding therefrom to discharge the treated material after it leaves the retort.

13. The combination with a combustion chamber, of a retort mounted to rotate therein and cut off from communication therewith, a housing located at the rear extremity of the combustion chamber into which housing the retort protrudes, its protruding extremity being open to communicate with the housing, sufficient space between the housing and chamber to allow power means to be applied to said retort, a liquid-containing tank located outside of the combustion chamber, and a conduit leading from the combustion chamber and provided with a relatively large hood immersed in the liquid and perforated at the top for the escape of the fumes into the liquid.

14. The combination with a combustion chamber, a retort mounted to rotate therein, a feed pipe located at one extremity of the combustion chamber, protruding into the retort and forming a bearing therefor at one extremity of the combustion chamber, a housing located at the opposite extremity of the retort beyond the combustion chamber, the retort protruding into the housing and open to communicate therewith, a gear surrounding the retort between the combustion chamber and the housing, and means connected with the gear for rotating the retort.

In testimony whereof I affix my signature in presence of two witnesses.

JOHN R. MOFFITT.

Witnesses:
 DENA NELSON,
 A. J. O'BRIEN.